(No Model.)  7 Sheets—Sheet 1.

G. GUNTZ.
MOLDING MACHINE.

No. 360,011.  Patented Mar. 29, 1887.

Fig. 1.

WITNESSES:
H. S. Reets
Geo. H. Montgomery

INVENTOR
Geo. Guntz

BY Herbert W. T. Jenner
ATTORNEY (No Model.)

G. GUNTZ.
MOLDING MACHINE.

No. 360,011. Patented Mar. 29, 1887.

Fig. 2.

WITNESSES:
H. S. Reete
Geo. W. Montgomery

INVENTOR
Geo. Guntz

BY Herbert W. T. Jenner
ATTORNEY (No Model.) 7 Sheets—Sheet 3.
G. GUNTZ.
MOLDING MACHINE.

No. 360,011. Patented Mar. 29, 1887.

Fig. 3.

WITNESSES: INVENTOR
Geo. Guntz

BY Herbert W. T. Jenner.
ATTORNEY (No Model.) 7 Sheets—Sheet 4.

G. GUNTZ.
MOLDING MACHINE.

No. 360,011. Patented Mar. 29, 1887.

Fig. 4.

WITNESSES:
H. S. Reets
Geo. H. Montgomery

Geo. Guntz
INVENTOR

BY
Herbert W. T. Jenner
ATTORNEY (No Model.) 7 Sheets—Sheet 5.

G. GUNTZ.
MOLDING MACHINE.

No. 360,011. Patented Mar. 29, 1887.

WITNESSES:

INVENTOR

BY
ATTORNEY (No Model.) 7 Sheets—Sheet 6.

G. GUNTZ.
MOLDING MACHINE.

No. 360,011. Patented Mar. 29, 1887.

WITNESSES:
H. S. Reets
Geo. N. Montgomery

Geo. Guntz
INVENTOR

BY Herbert W. T. Jenner
ATTORNEY

(No Model.) 7 Sheets—Sheet 7.

G. GUNTZ.
MOLDING MACHINE.

No. 360,011. Patented Mar. 29, 1887.

WITNESSES:
H. S. Reets
Geo. H. Montgomery

INVENTOR
Geo. Guntz

BY Herbert W. T. Jenner.
ATTORNEY

UNITED STATES PATENT OFFICE.

GEORGE GUNTZ, OF WILKES-BARRÉ, PENNSYLVANIA.

MOLDING-MACHINE.

SPECIFICATION forming part of Letters Patent No. 360,011, dated March 29, 1887.

Application filed September 11, 1886. Serial No. 213,286. (No model.)

*To all whom it may concern:*

Be it known that I, GEORGE GUNTZ, a citizen of the United States, residing at Wilkes-Barré, in the county of Luzerne and State of Pennsylvania, have invented certain new and useful Improvements in Molding - Machines; and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to molding-machines for use in the manufacture of car-wheels; and it consists in the novel construction and combination of the parts, hereinafter fully described and claimed.

A frame, $a$, is provided, and is securely bolted to a suitable foundation. The head of the frame is provided with a bolt, $a'$, which passes through a plate, $a^2$, and secures the anvil $f$ firmly to the head of the machine-frame.

A revoluble table, $d$, provided with a central stem, $b^2$, is pivoted upon the pedestal $b$, which projects from the frame $a$, and a ball-bearing, $b'$, is formed between the said pedestal and the table, so that there may be very little friction between them. The lower side of the table $d$ has a circular flange, $c^3$, depending from it, which revolves in contact with the upper surface of a circular track, $c$, which supports the edges of the table. The table is also provided with a circular toothed rack, $d'$, into which the bevel-wheel $c'$ gears and gives a rotary movement to the table, as will be more fully described hereinafter. A tight pulley, $o'$, and a loose pulley, $o^3$, are mounted on a shaft, $w'$, journaled in the brackets $y$ at the rear of the machine, and receive rotary motion from any suitable line or counter-shaft by means of a belt arranged in the ordinary manner.

A worm, $w$, is secured upon the shaft $w'$, and gears into the worm-wheels $o$ and $p$, which are placed below and above it, respectively. The worm-wheel $p$ runs loose upon the shaft $g^3$, which is journaled in the frame $a$, and the worm-wheel is prevented from slipping off the end of the shaft $g^3$ by the collar $p^2$, secured to the shaft. A shaft, $g^2$, is also journaled in the frame $a$ beneath the shaft $g^3$, and has the aforesaid bevel-wheel $c'$ secured upon its end. Gear-wheels $c^2$ $c^2$ connect the shafts $g^3$ and $g^2$ together, and communicate the rotary movement of the driving pulley $o'$ to the table $d$. The said gears $c^2$ $c^2$ may be ordinary spur-wheels, or they may be eccentric wheels, according whether it is desired that the table should move with a uniform or a varying velocity. The motion of the table is rendered automatically intermittent by means of the clutch $q'$, secured upon the shaft $q^3$.

A clutch-pin, $z$, having a beveled projection, $z^5$, slides in a cross-groove formed in the clutch, and engages with a hole in the hub of the worm-wheel $p$, into which it is pressed by the spring $z^3$, which is secured to the clutch and bears upon the end of the said pin. A groove, $z^2$, is formed in the frame, for the spring $z^3$ to revolve in, so that it is preserved from injury and is free to act at all times. A circumferential groove, $s^4$, is formed in the clutch. A pivoted lever, $s^2$, has a wedge, $s$, at one end, which can be dropped into the groove $s^4$. When the clutch revolves and the wedge is in the groove, the projection on the clutch-pin strikes upon the wedge and the clutch-pin is drawn back against the pressure of spring $z^3$ until out of gear with the worm-wheel $p$, which continues to revolve without communicating its motion to the shaft $g^3$.

The lever $s^2$ is pivoted to the bracket $s'$, secured to the frame $a$, and the tail of the lever engages with and is operated by the revolving cam $r$, which is secured upon the shaft $t$, journaled in the brackets $u$ $u'$, also secured to frame $a$. A worm-wheel, $v$, is secured upon the shaft $t$, and receives motion from the worm $x$, secured upon the end of the shaft $w'$. The worm-wheel $o$ also runs loose upon its shaft $g$, which is provided with the collar $p^2$, to keep the wheel $o$ from slipping off. A clutch, $q$, is secured to the shaft $g$, and is provided with a clutch-pin, $z$, and spring $z^3$, exactly as before described as applied to clutch $q'$. A cam, $r'$, is secured on the lower end of the shaft $t$, and is the same as cam $r$, and operates the lever $s^3$, which is pivoted in the same manner as the lever $s^2$, and is provided with a wedge, $s$, for disengaging the clutch-pin from the hub of the worm-wheel $o$, the only difference in the levers $s^2$ and $s^3$ being that the wedges $s$ are placed upon opposite sides of the pivot and act in opposite directions, because the worm-wheels $p$ and $o$ turn in opposite directions. The shafts $g^3$ and $g$ have their intermittent motions communicated to them alternately, as will be more fully explained hereinafter.

The revoluble table $d$ is provided with four or more equidistant holes or chambers, each of which is provided with flanges $n^3$ at the bottom, which form guides to prevent the rams $m$ from turning, and rests for supporting the circular flanged bushes $n^2$ and the patterns $n$.

The molding-box for the car-wheel may consist of the chill $e$, which forms the tread of the wheel. This chill $e$ is provided with guide-pins $e^2$, which slip into holes in the table and hold the chill in its proper position over the ram $m$. The chill is further provided with the lifter $e'$, which consists of a flange bolted to the chill, and arms or plates depending from the flange to support the sand between the arms and round the hub of the car-wheel in the said molding-box or chill.

Figure 4:
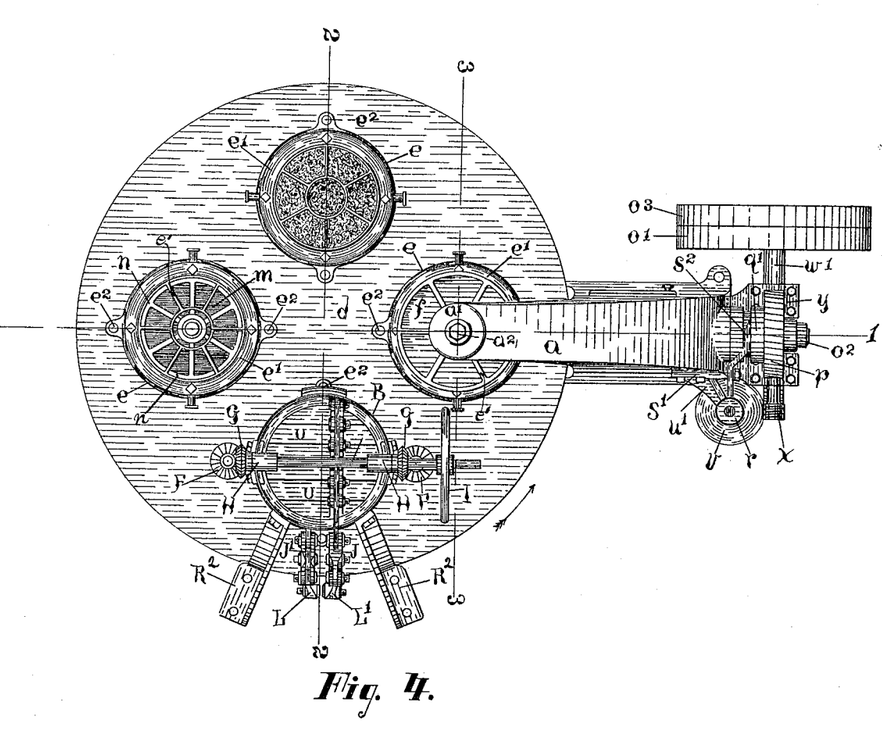
Fig. 4 is a plan view from above of the complete machine.

The pattern $n$ consists of a central boss, to form the hub of the wheel, and an outer cylinder of the thickness of the rim of the wheel, the said boss and cylinder being united by arms, as shown in Fig. 4, which arms on the pattern are exactly the same as the arms of the wheel when cast. A spindle, $l$, is screwed centrally into the boss of the wheel-pattern $n$.

The ram $m$ consists of an irregular figure cored out for lightness, and having projections fitting the interior portion of the wheel-pattern $n$ between the arms, as shown by the shaded lines in Fig. 4. A central hole is formed in the ram for the spindle $l$, and the lower part of the ram is made to slide between the flanges $n^3$ on the table, so that the ram cannot turn round in the hole of the table, and as the ram engages with the arms of the wheel-pattern $n$ the said pattern is held from turning also.

Two rollers, $k$, are journaled upon pins $k^2$ in the lower part of the ram, the use of the rollers being to reduce the friction between the ram and the lifting-cams $j$ $j$, which will be described hereinafter.

A is the reservoir for the molding-sand. This is shown cylindrical, but may be of any other convenient shape. It is supported by the brackets S, having feet $R^2$ bolted securely to the foundation. The lower end of the reservoir is provided with a conical hopper, terminating with a circular orifice which exactly coincides with the top of the molding-box or chill. The reservoir is arranged to come over the table and fill the molding-box with sand before the table is turned, so that the said box may come under the anvil $f$. The reservoir A is provided with a vertically-adjustable frame, T', having the valves U journaled in it on the pivots U', something like the slats of a blind or shutter are pivoted. Each valve U has a lever, W, projecting from it, and each lever W is pivotally connected to the horizontal lever V, so that all the valves can be opened or closed at once and by the horizontal movement of lever V.

J' is a bell-crank pivoted to an extension of the frame T' and pivotally connected to the lever V and to the link L. The link L is provided with several holes for the pivot-pin at its upper end, to allow of vertical adjustment.

A fixed frame, T, is also secured in the reservoir above the adjustable frame T', and is provided with pivoted valves and a horizontal lever for opening them, the same as before described. J is a bell-crank which connects the horizontal lever of the frame T with a link, L'.

Figures 5, 6:
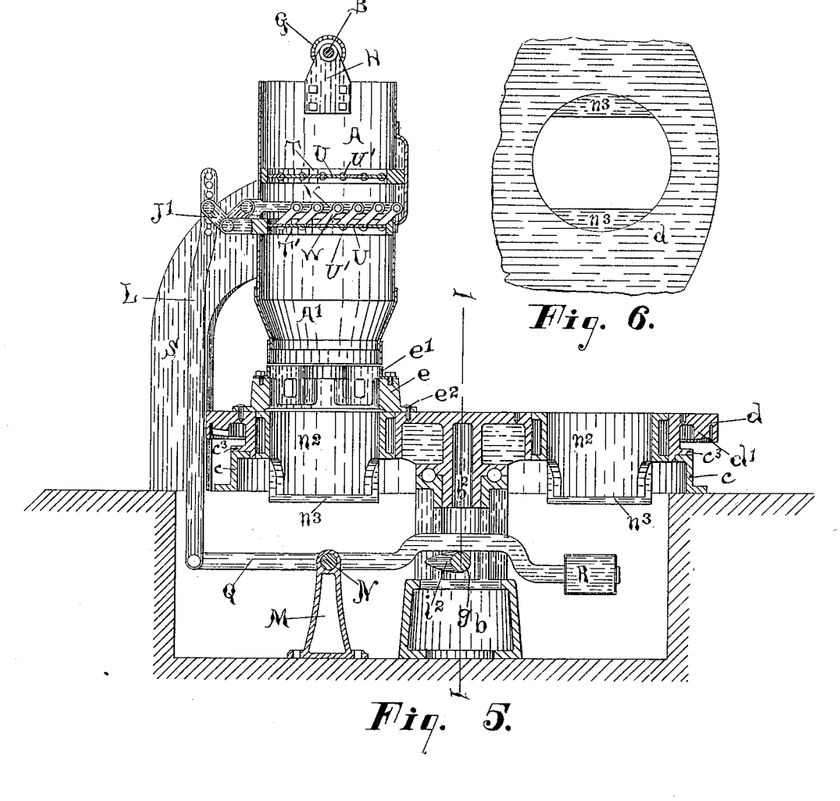
Fig. 5 is a vertical transverse section on the line 2 2 in Fig. 4.
Fig. 6 is a detail plan view from above of a portion of the revolving table.

The horizontal and bell-crank levers of the upper valves are not shown in Fig. 5, because, as will be seen on reference to Fig. 4, the said levers are arranged equidistant from and upon opposite sides of the center line of the reservoir through which the section shown in Fig. 5 is taken.

Q are levers provided with weights R at their free ends. These levers are pivoted on the pin N in the bracket M, which is securely bolted to the foundation, and their opposite ends are pivoted to the links L and L', respectively. Two similar cams, $i^2$, are secured on the shaft $g$ at right angles, or thereabout, to each other, and each cam operates to lift one of the levers Q.

Prepared molding-sand is placed in the upper part of the reservoir A, and an empty molding-box is brought under the conical hopper A'. The revolution of the shafts $g$ causes the first cam $i^2$ to lift its lever Q, and thereby open the valves U of the upper frame, T, and allow the charge of sand to fall through them and fill the space between them and the valves of the lower frame, T'. The weight R closes the valves as soon as the cam allows the lever Q to fall, and the continued revolution of shaft $g$ causes the second cam $i^2$ to lift its lever Q, and thereby open the valves U of the lower frame, T', and allow the sand to fall through them into the mold. The other weight R closes the lower valves, to which it is connected, as before described concerning the upper valves.

The charge of sand being regulated in amount by the distance between the upper and lower frames, the lower frame is made adjustable in the following manner: The adjustable frame T' is provided with arms D, which project through slots in the reservoir, the said slots being provided with cover-plates D', which slide with the arms to prevent the escape of sand.

I is a hand-wheel mounted upon a shaft, B, having bevel-wheels G G, also secured on it, and journaled in brackets H, secured to the top of the reservoir.

C C are twin screws supported by brackets E, also secured to the top of the reservoir. The lower ends of the screws C engage with the arms D, and the upper ends are provided with the bevel-wheels F F, which gear into the bevel-wheels G G, so that the lower frame, T', is raised or lowered as far as desired by turning the hand-wheel I. Two similar cams, $j$, are secured on the shaft $g$, for raising the ram $m$, and a third cam, $i$, is also secured to the said shaft between the cams $j$, for raising the pattern $n$. Additional bearings, $h$, are secured to the frame $a$ to support the shaft $g$ on each side of the cams $j$.

Figure 1:
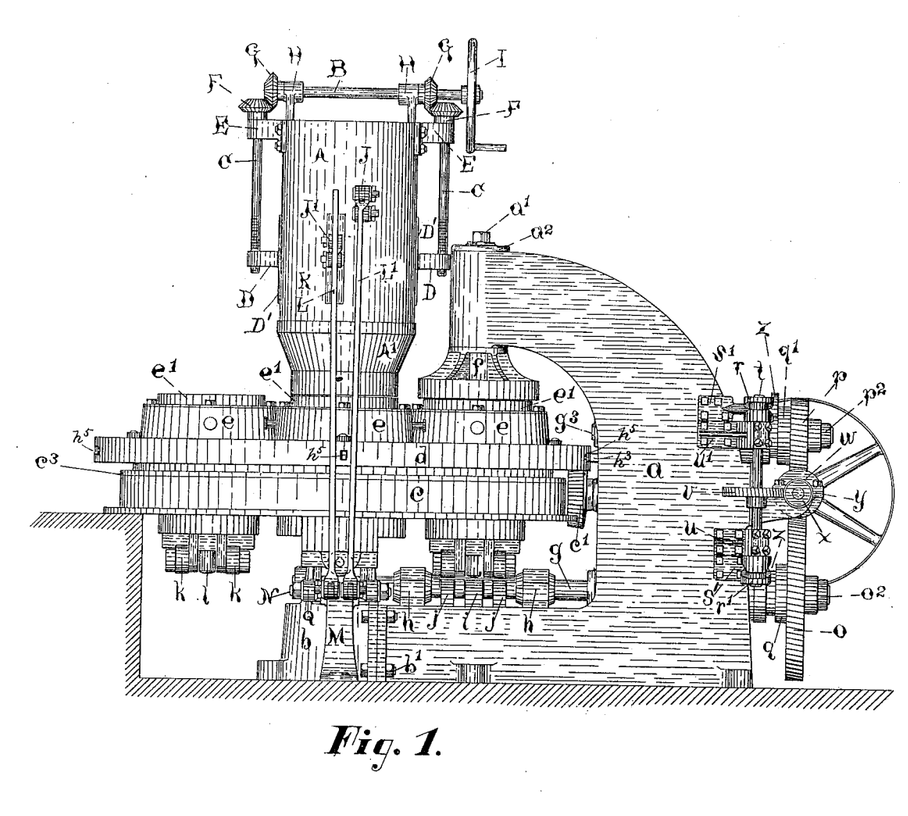
Figure 1 is a side view of the machine complete.
Figure 2:
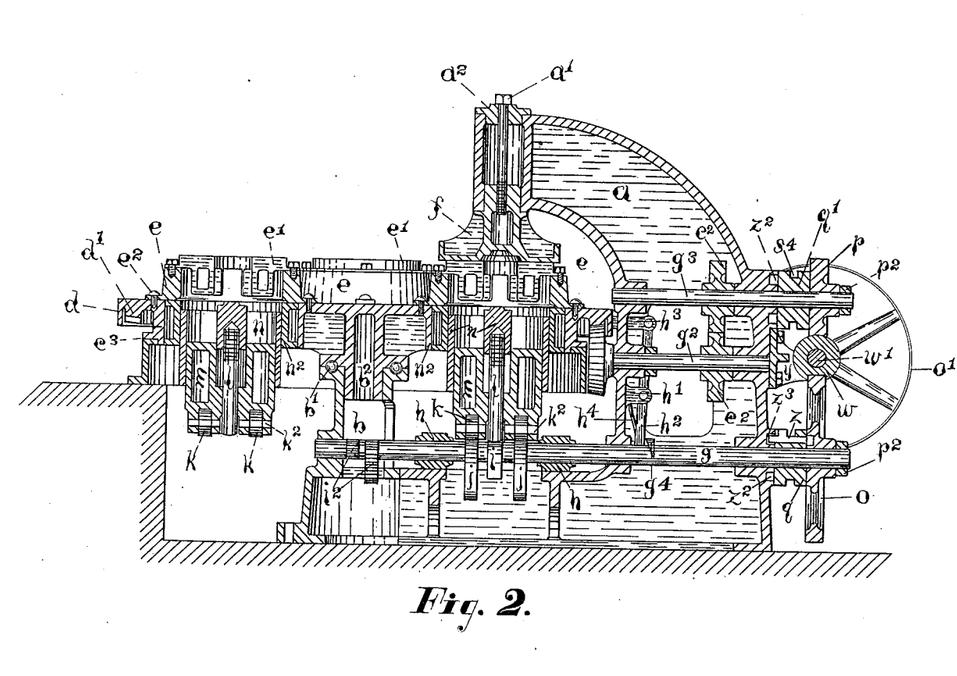
Fig. 2 is a vertical longitudinal section through the machine, taken on the line 1 1 in Figs. 3, 4, and 5.
Figure 3:
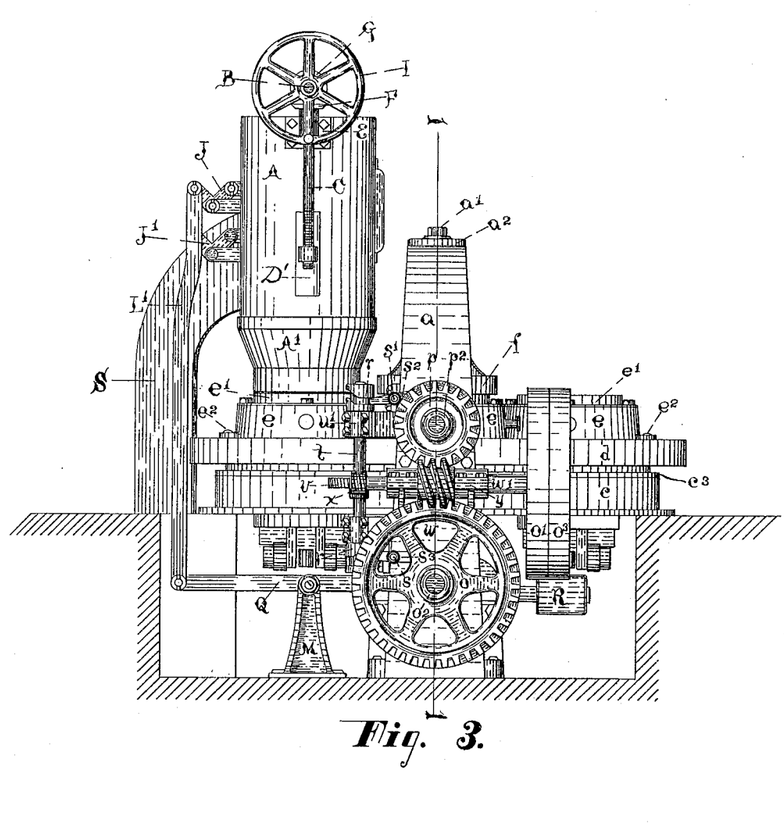
Fig. 3 is an end view of the machine on the driving-gear side.

The ram and pattern are both down, as shown in Fig. 2, while under the reservoir A, so that the whole of the space from the top of the ram to the top of the flange of the lifter $e'$ is filled with loose sand. The table is then turned by means of the circular rack and shaft $g^2$ until the molding-box or chill is directly under the anvil $f$ and the rollers $k$ are over the cams $j$. The revolution of the shaft $g$ then causes the cams $i$ and $j$ to raise the pattern $n$ and ram $m$ simultaneously until they are raised to the full extent, and the sand is uniformly compressed about them in the molding-box or chill. The cam $i$ then leaves the end of the pin $l$ and allows the pattern to descend slowly by its own weight. The radial portions of cams $j$ roll upon the rollers $k$ and hold the ram in its raised position until the descent of the pattern is completed. The cams $j$ then allow the ram to gradually descend in a similar manner. The table is then revolved so as to bring another molding-box under the anvil. The rammed-up molding-box is removed from the table when it comes opposite the reservoir and is carried to the casting-pit. An empty molding-box or chill is placed on the table in place of the rammed-up one just removed before the table comes round again under the reservoir. A latch, $h^3$, passes through a hole in the frame $a$, which guides and supports it, and engages with a hole, $h^5$, in the table each time the molding-box is brought under the anvil $f$. The other end of the latch is pivoted to the lever $h^2$, which is pivoted in the bracket $h'$ inside the frame. A spring, $h^4$, between the lever and the frame causes the latch to engage with the holes $h^5$ and lock the table automatically each time a molding-box comes under the anvil. A tappet, $g^4$, projects from the shaft $g$ and strikes the end of the lever $h$ just before the table is ready to commence its rotary movement. This tappet drives back the latch, holding it until the table has gone far enough for the hole to be clear of it, and then the latch is allowed to bear upon the rim of the table, ready to slip into the next hole $h^5$ when it comes round.

The operation of every working part of the machine is automatic. The gearing is arranged so that the upper clutch throws the shaft $g^3$ out of gear and stops the table every time a molding-box comes under the anvil, and the table is locked by the latch. Immediately the table stops the shaft $g$ commences to revolve, the ram and pattern are raised and lowered, as before described, and the next adjacent molding-box receives its charge of sand from the reservoir. This being accomplished, the continued revolution of shaft $g$ raises the latch out of gear with the table, and at this moment the lower worm-wheel is unclutched from the shaft $g$ by the lower cam, $r'$, acting on the wedge-lever $s^3$. The shaft $g$ remains stationary. The shaft $g^3$ commences to turn and revolves the table, as before described.

Figure 7:
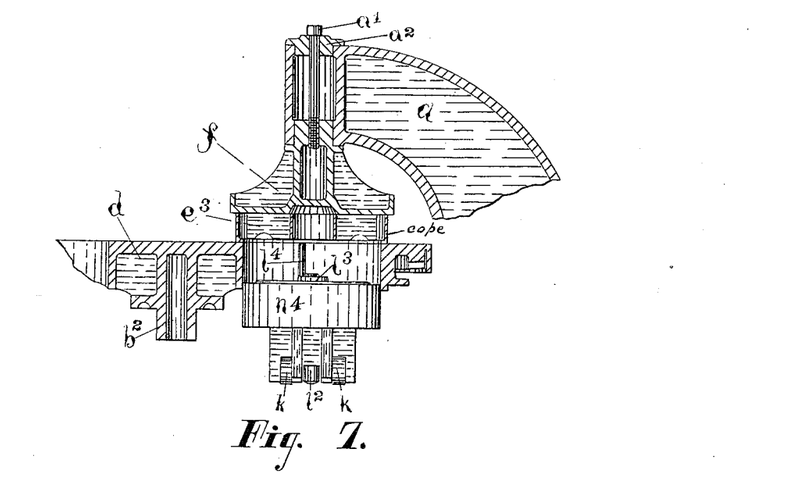
Fig. 7 is a detail view showing portions of the machine head and table and the method of forming the pouring-gate.
Figure 8:
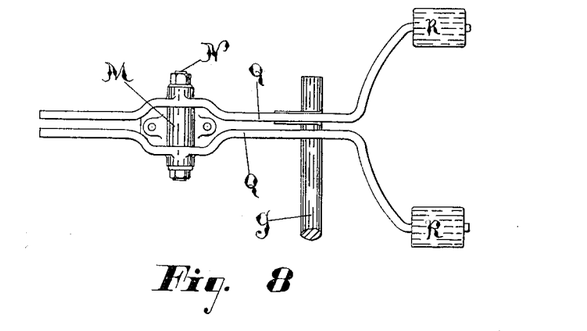
Fig. 8 is a detail plan view of the levers for operating the valves of the sand-reservoir.
Figure 9:
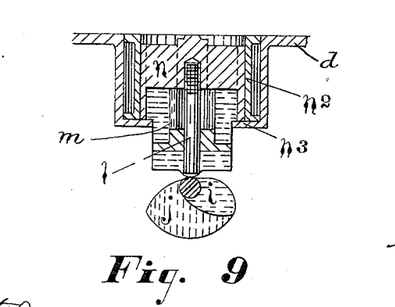
Fig. 9 is a transverse section through a portion of the table, taken on the line 3 3 in Fig. 4.
Figures 10, 11, 12, 13, 14, 15:
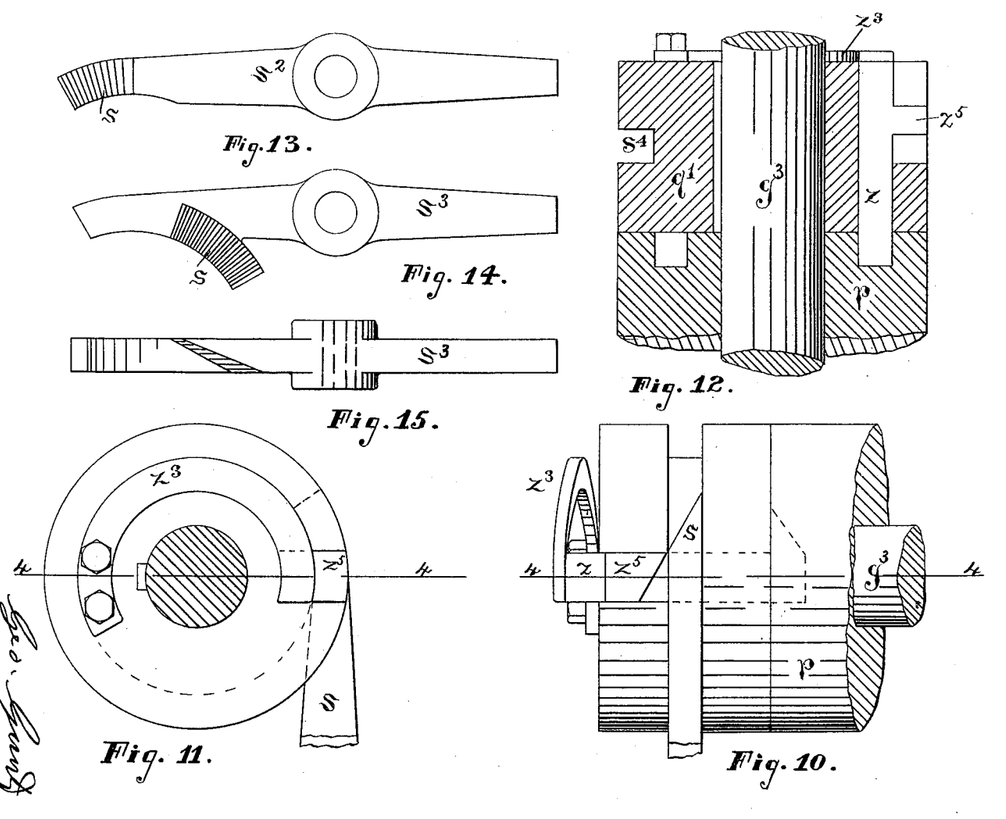
Fig. 10 is a detail plan view of the upper clutch for disengaging the driving mechanism.
Fig. 11 is an end view of the same.
Fig. 12 is a section through the clutch, taken on the line 4 4 in Figs. 10 and 11.
Fig. 13 is a detail side view of the lever for operating the upper clutch.
Fig. 14 is a similar view of the lever for operating the lower clutch.
Fig. 15 is a plan view from below of the lever shown in Fig. 14.

A second machine is used to form the top part of each mold. This second machine is exactly like the one described; but instead of a chill being used to form the molding-box, the top box, $e^3$, is used, as shown in Fig. 7. This top box is provided with cross-bars and a central ring to support the sand in the box. The bush $n^2$ is not used. The ram $n^4$ fits the hole in the table, and is provided with the rollers $k$ for lifting it, the same as the ram $m$, previously described. A bead, $l^3$, is formed on the head of the ram and is pressed in the sand, thus forming a pattern for the only remaining part of the wheel which has to be molded in the top box. A central spindle, $l^2$, is provided, and is worked in the same manner as the spindle $l$. The upper end of this spindle makes an impression in the sand, into which the core of the central hole of the hub is afterward placed. The spindle $l$ also has the gate-pattern $l^4$ secured to it. This gate-pattern is drawn out downward with the central pin, and the metal for the wheel is poured through the gate-hole made by it after the two parts of the mold have been clamped together in the casting-pit. The pins $e^2$, which guided the chill on the table, serve as guide-pins for the top box when the chill is turned over in the casting-pit.

What I claim is—

1. In a molding-machine, the combination of a revoluble table having a hole or chamber provided with guide-flanges at the bottom, a molding-box or chill resting on the table around the hole, a pattern resting on the flanges inside the hole and provided with a central stem for raising it, a ram guided and supported by the said flanges and fitting the interior of the pattern, and mechanism for raising the said central stem and ram.

2. In a molding-machine, the combination of a revoluble table having a series of equidistant holes or chambers provided with guide-flanges, molding-boxes resting on the table around the holes, patterns resting on the flanges inside each hole and provided with central stems for raising them, rams guided and supported by the said flanges and fitting the interior of each pattern, an anvil rigidly supported above the table, and mechanism under the table for raising each central stem and the ram when brought under the anvil by the revolution of the table.

3. In a molding-machine, the combination of a table having a hole or chamber, a molding-box resting on the table around the hole, an anvil rigidly supported over the molding-box, a pattern provided with a central stem for raising it, guided in the hole in the table, a ram fitting the interior of the pattern, a revolving cam under the central stem for raising the pattern, and a revolving cam or cams under the ram for raising and holding it raised up until the pattern has descended to its original position.

4. In a molding-machine, the combination of a revoluble table having a hole or chamber provided with guide-flanges $n^3$, the molding-box or chill $e$, the lifter secured to the said box, a fixed anvil above the molding-box, the pattern $n$, supported by the said flanges and provided with a central stem, the ram $m$, fitting the interior of the pattern and provided with rollers $k$, the revolving cam $i$, for raising the pattern, and the revolving cams $j$, bearing on the said rollers, for raising the ram when under the anvil and holding it raised up until the pattern has descended to its original position.

5. In a molding-machine, the combination of a reservoir for sand, two frames, each provided with a series of pivoted slats or valves and supported one above the other within the reservoir, the levers W, projecting from each valve, a horizontal lever and a bell-crank lever pivotally connected to the levers W of each series of valves, and levers for opening the valves in the upper and lower frames alternately, so that a measured charge of sand is delivered from the upper to the lower part of the reservoir.

6. In a molding-machine, the combination of a reservoir for sand, a fixed frame provided with a series of pivoted slats or valves supported within the reservoir, a vertically-adjustable frame, also provided with a series of pivoted slats or valves supported under the fixed frame, the levers W, projecting from each valve, a horizontal lever and a bell-crank lever pivotally connected to the levers W of each series of valves, and levers for opening the valves in the fixed and adjustable frames alternately, so that an adjustable measured charge of sand is delivered from the upper to the lower part of the reservoir.

7. In a molding-machine, the combination of a reservoir for sand, a vertically-adjustable frame provided with valves and having arms projecting through slots in the reservoir, cover-plates for the slots, secured to the arms, twin screws engaging with the arms, and mechanism for revolving the screws simultaneously and adjusting the position of the said frame within the reservoir.

8. In a molding-machine, the combination of a reservoir for sand, two frames, each provided with valves supported one above the other within the reservoir, levers pivotally connected to the valves, for delivering a measured charge of sand from the upper to the lower part of the reservoir and from the lower part of the reservoir to the molding-box, two revolving cams for operating the levers alternately in one direction, and weights secured to the levers for restoring them to their original position.

9. In a molding-machine, the combination of a reservoir for sand, a frame supported in the reservoir, the valves U, each provided with pivots U' and lever W, a horizontal lever pivotally connected to each of the levers W, a bell-crank pivoted to the frame and to the horizontal lever, and a link or lever pivoted to the bell-crank for opening and closing the valves.

10. In a molding-machine, the combination of a revoluble table provided with a circular toothed rack, a spur-wheel for driving the rack, a worm-wheel running loose upon a shaft connected to and actuating the said spur-wheel, a revolving worm for turning the worm-wheel continuously, a clutch secured to the shaft next to the worm-wheel, and mechanism driven by the said worm for causing the clutch to engage and disengage with the worm-wheel and revolve and stop the table periodically at fixed intervals.

11. In a molding-machine, the combination of a revoluble table provided with a circular toothed rack, a spur-wheel mounted on a shaft for driving the rack, a worm-wheel running loose upon a second shaft, eccentric gear-wheels for communicating a variable velocity from one shaft to the other, a revolving worm for turning the worm-wheel continuously, a clutch secured to the second shaft next to the worm-wheel, and mechanism driven by the said worm for causing the clutch to engage and disengage with the worm-wheel periodically at fixed intervals.

12. In a molding-machine, the combination of a revoluble table having a hole or chamber in it, a molding top box resting on the table around the hole, a pouring-gate pattern provided with a central stem, a ram guided within the hole in the table and provided with a central hole for the said stem, an anvil rigidly supported over the molding-box, a revolving cam for raising the central stem, and a revolving cam or cams for raising the ram and holding it in its raised position until the gate-pattern has been withdrawn from the molding-box.

13. In a molding-machine, the combination of a revoluble table having equidistant holes or chambers in it, a ram and a pattern guided in each hole in the table, molding-boxes resting on the table around the holes, a sand-reservoir provided with a delivery-valve over one of the molding-boxes, an anvil rigidly supported over the next adjacent molding-box, a revolving shaft under the table, provided with cams for simultaneously opening the delivery-valve of the reservoir and raising the pattern and ram under the anvil, and intermediate lever mechanism connecting the sand-delivery valve with the cams on the said shaft.

14. In a molding-machine, the combination of a revoluble table having equidistant holes or chambers and a circular-toothed rack, a ram and a pattern guided in each hole in the table, molding-boxes resting on the table around the holes, a sand-reservoir provided with a delivery-valve over one of the molding-boxes, an anvil rigidly supported over the next adjacent molding-box, a revolving shaft under the table, provided with cams for opening the delivery-valve of the reservoir and raising the ram and pattern simultaneously, intermediate lever mechanism connecting the sand-delivery valve with the cams on the said shaft, a shaft journaled in the frame of the machine and provided with a spur-wheel gearing into the circular rack on the table, a continuously-revolving wheel running loose upon each of the said shafts, and clutch mechanism secured upon each of the said shafts and automatically engaging the said revolving wheels with their shafts intermittently and alternately, as and for the purpose set forth.

15. In a molding-machine, the combination of a revoluble table having a hole or chamber, a molding-box resting on the table around the hole, an anvil rigidly supported over the molding-box, a ram and a pattern guided in the hole on the table, an automatic spring-latch engaging with the table and holding it stationary, a revolving shaft under the table, provided with cams for raising the ram and pattern, and a tappet secured to the said shaft, for releasing the latch and allowing the table to revolve when the cams have completed their actions.

In testimony whereof I affix my signature in presence of two witnesses.

GEORGE GUNTZ.

Witnesses:
HERBERT W. T. JENNER,
WILLIAM FITCH.